US012741781B2

(12) United States Patent
Brink

(10) Patent No.: US 12,741,781 B2
(45) Date of Patent: Sep. 22, 2026

(54) TRAY WITH SEPARABLE FEATURES

(71) Applicant: Graphic Packaging International, LLC, Atlanta, GA (US)

(72) Inventor: Thomas Brink, Grand Rapids, MI (US)

(73) Assignee: Graphic Packaging International, LLC, Atlanta, GA (US)

( * ) Notice: Subject to any disclaimer, the term of this patent is extended or adjusted under 35 U.S.C. 154(b) by 11 days.

(21) Appl. No.: 18/131,411

(22) Filed: Apr. 6, 2023

(65) Prior Publication Data

US 2023/0322435 A1 Oct. 12, 2023

Related U.S. Application Data

(60) Provisional application No. 63/328,614, filed on Apr. 7, 2022.

(51) Int. Cl.

| | |
|---|---|
| ***B65D 5/54*** | (2006.01) |
| ***B31B 50/73*** | (2017.01) |
| ***B65D 5/20*** | (2006.01) |
| ***B65D 5/42*** | (2006.01) |
| *B31B 100/00* | (2017.01) |
| *B31B 110/30* | (2017.01) |
| *B31B 120/20* | (2017.01) |

(52) U.S. Cl.

CPC .............. *B65D 5/54* (2013.01); *B31B 50/732* (2017.08); *B65D 5/2038* (2013.01); *B65D 5/2085* (2013.01); *B65D 5/4204* (2013.01); *B31B 2100/0024* (2017.08); *B31B 2110/30* (2017.08); *B31B 2120/20* (2017.08)

(58) Field of Classification Search

CPC ...... B65D 5/54; B65D 5/2038; B65D 5/2085; B65D 5/4204; B65D 5/0005; B65D 5/0085; B65D 5/009; B65D 5/02; B65D 5/029; B65D 5/06; B65D 5/10; B65D 5/16; B65D 5/20; B65D 5/5445; B65D 5/5475; B65D 5/5495

USPC .......................................................... 206/557

See application file for complete search history.

(56) References Cited

U.S. PATENT DOCUMENTS

| | | | |
|---|---|---|---|
| 499,655 | A | 6/1893 | Clark |
| 642,121 | A | 1/1900 | Hildreth |
| 1,048,577 | A | 12/1912 | Pardoe |

(Continued)

FOREIGN PATENT DOCUMENTS

| | | |
|---|---|---|
| DE | 2 320 190 | 11/1973 |
| DE | 36 27 019 A1 | 2/1988 |

(Continued)

OTHER PUBLICATIONS

International Search Report and Written Opinion for PCT/US2023/017666 dated Jul. 27, 2023.

*Primary Examiner* — Robert Poon

(74) *Attorney, Agent, or Firm* — Andrew N. Claerbout; FisherBroyles, LLP

(57) ABSTRACT

A tray for holding one or more articles includes a plurality of panels extending at least partially around an interior space of the tray, the plurality of panels including a bottom panel, at least one lower side panel, at least one upper side panel, and at least one end panel, and a plurality of end flaps foldably connected to a respective panel of the plurality of panels, the plurality of panels forms a plurality of separably connected tray portions such that the tray is separable into respective tray portions.

17 Claims, 5 Drawing Sheets

(56) References Cited

U.S. PATENT DOCUMENTS 1,503,161 A 7/1924 Hornecker
1,634,073 A 6/1927 Labombarde
1,656,919 A 1/1928 Marsh
1,762,704 A 6/1930 Smith
1,901,483 A 3/1933 Ware, Jr.
1,925,102 A 9/1933 Levkoff
1,951,408 A 3/1934 Haven
1,998,147 A * 4/1935 Stegman .............. B65D 5/5495 229/110
2,027,079 A 1/1936 Weiss
2,054,596 A 9/1936 Ford
2,141,743 A 12/1938 Ethridge
2,145,430 A 1/1939 New
2,147,563 A 2/1939 William
2,152,079 A 3/1939 Mott
2,180,808 A 11/1939 Jacobstein et al.
2,194,220 A 3/1940 Jacobstein et al.
2,196,243 A 4/1940 Bensel
2,290,971 A 7/1942 King
2,330,294 A 9/1943 Leavitt et al.
2,409,692 A 10/1946 Nyberg
2,416,332 A 2/1947 Lehman
2,643,589 A 6/1953 Weiss
2,643,812 A 6/1953 Lange
2,679,349 A 5/1954 Mullinix
2,710,134 A 6/1955 Schroeder et al.
2,791,362 A 5/1957 Nute
2,875,938 A 3/1959 Bramhill
2,877,736 A 3/1959 Simmons
2,967,610 A 1/1961 Ebert et al.
3,002,613 A 10/1961 Merkel et al.
3,071,882 A 1/1963 Eisman et al.
3,090,483 A 5/1963 Altree et al.
3,099,381 A 7/1963 Meyers
3,157,342 A 11/1964 Grady
3,197,115 A 7/1965 Peter
3,205,603 A 9/1965 Brumley
3,265,283 A 8/1966 Farquhar
3,276,665 A 10/1966 Rasmussen
3,276,667 A 10/1966 Johnson et al.
3,280,968 A 10/1966 Craine
3,434,648 A 3/1969 Du Barry, Jr.
3,653,495 A 4/1972 Gray
3,677,458 A 7/1972 Gosling
3,721,339 A 3/1973 Seyer
3,759,378 A 9/1973 Werth
3,786,914 A 1/1974 Beutler
3,884,348 A 5/1975 Ross
3,935,989 A 2/1976 Naylor
3,958,744 A 5/1976 Herglotz
4,004,691 A 1/1977 Wihksne
4,008,849 A 2/1977 Baber
4,018,378 A 4/1977 Persson
4,055,293 A 10/1977 Stramaglia
4,058,248 A 11/1977 McArdle
4,111,297 A 9/1978 Paulin
4,113,100 A 9/1978 Soja et al.
4,260,098 A 4/1981 Manizza et al.
4,265,390 A 5/1981 Faller et al.
4,340,169 A 7/1982 Webinger
4,343,428 A 8/1982 Persson
4,361,265 A 11/1982 Benham
4,470,538 A 9/1984 Heathcock et al.
4,472,896 A 9/1984 Brauner et al.
4,497,433 A 2/1985 Wischusen, III
4,519,538 A 5/1985 Omichi
4,533,079 A 8/1985 Persson
4,558,785 A 12/1985 Gordon
4,586,643 A 5/1986 Halabisky et al.
4,630,733 A 12/1986 Fear
4,684,023 A 8/1987 Cortopassi
4,742,917 A 5/1988 Bornwasser
4,760,952 A 8/1988 Wachter et al.
4,773,541 A 9/1988 Riddell
4,815,609 A 3/1989 Kiedaisch
4,886,160 A 12/1989 Kilgerman
4,901,457 A 2/1990 Chandler
5,012,929 A 5/1991 Roosa
D320,743 S 10/1991 Alexander et al.
5,058,803 A 10/1991 Gulliver
5,085,323 A 2/1992 Kuchenbecker et al.
5,105,950 A 4/1992 Gottfried et al.
RE33,979 E 6/1992 Cortopassi
5,181,650 A 1/1993 Hollander et al.
D342,446 S 12/1993 Parker et al.
D346,272 S 4/1994 Cessor
D346,552 S 5/1994 Krupa
5,368,194 A 11/1994 Oliff et al.
5,383,596 A 1/1995 Gulliver et al.
5,419,486 A 5/1995 Bennett et al.
5,505,372 A 4/1996 Edson et al.
5,509,534 A 4/1996 Taravella et al.
5,662,265 A 9/1997 Jensen
5,690,273 A 11/1997 Jensen
5,697,549 A 12/1997 Yocum
5,699,957 A 12/1997 Blin et al.
5,722,583 A 3/1998 Focke et al.
5,783,030 A 7/1998 Walsh
5,788,117 A 8/1998 Zimmanck
5,826,781 A 10/1998 Jensen
5,842,576 A 12/1998 Snow
5,855,315 A * 1/1999 Roseth ................. B65D 5/5495 229/120.04
5,857,570 A 1/1999 Brown
5,878,947 A 3/1999 Hoy et al.
5,881,884 A 3/1999 Podosek
5,909,840 A 6/1999 Schultheiss
5,921,398 A 7/1999 Carroll
5,927,498 A 7/1999 Saam
5,979,749 A 11/1999 Bozich
6,015,084 A 1/2000 Mathieu et al.
6,027,018 A 2/2000 Yocum
6,041,997 A 3/2000 Jensen
6,068,181 A 5/2000 Cai
6,102,281 A 8/2000 Lafferty et al.
D431,462 S 10/2000 Menaged et al.
6,129,211 A 10/2000 Prakken et al.
6,135,289 A 10/2000 Miller
6,158,579 A 12/2000 Rosenbaum
6,223,978 B1 5/2001 Drager
6,371,364 B1 4/2002 Maillot et al.
6,386,369 B2 5/2002 Yuhas et al.
D458,127 S 6/2002 De Groote
D460,691 S 7/2002 Morris et al.
6,419,152 B1 7/2002 Tokarski
6,435,351 B1 8/2002 Gibb
6,478,159 B1 11/2002 Taylor et al.
D467,499 S 12/2002 Garza et al.
6,510,982 B2 1/2003 White
6,523,692 B2 2/2003 Gregory
D473,787 S 4/2003 Jones, Jr. et al.
6,588,652 B2 7/2003 Cai
D484,043 S 12/2003 Hwang et al.
6,681,983 B2 1/2004 Moore
6,729,475 B2 5/2004 Yuhas et al.
6,811,028 B2 11/2004 Kim et al.
6,834,793 B2 12/2004 Sutherland
6,854,639 B2 2/2005 Walsh
6,913,189 B2 7/2005 Oliff et al.
6,918,487 B2 7/2005 Harrelson
6,923,365 B2 8/2005 Auclair et al.
6,978,892 B2 12/2005 Bansal et al.
7,021,468 B2 4/2006 Cargile, Jr.
7,201,714 B2 4/2007 Zoeckler et al.
7,216,797 B2 5/2007 Lebras
7,225,930 B2 6/2007 Ford et al.
7,270,259 B2 9/2007 Sutherland
7,284,662 B2 10/2007 DeBusk et al.
7,293,652 B2 11/2007 Learn et al.
7,328,834 B2 2/2008 Harrelson
7,398,631 B2 7/2008 Learn
7,398,632 B2 7/2008 Learn et al.
7,416,109 B2 8/2008 Sutherland
8,028,839 B2 10/2011 Learn

(56) References Cited

U.S. PATENT DOCUMENTS

| | | | | |
|---|---|---|---|---|
| 11,472,597 | B1 * | 10/2022 | Wigington | B65D 5/48002 |
| 2001/0001447 | A1 | 5/2001 | Gregory | |
| 2002/0043554 | A1 | 4/2002 | White | |
| 2002/0170845 | A1 | 11/2002 | Oliff | |
| 2003/0024848 | A1 | 2/2003 | Oycke | |
| 2003/0047596 | A1 | 3/2003 | Brown | |
| 2004/0074953 | A1 | 4/2004 | Yocum | |
| 2004/0099570 | A1 | 5/2004 | Cargile | |
| 2005/0092649 | A1 | 5/2005 | Ford et al. | |
| 2005/0155905 | A1 | 7/2005 | Monk | |
| 2005/0167291 | A1 | 8/2005 | Sutherland | |
| 2005/0199690 | A1 | 9/2005 | Peterson | |
| 2005/0218203 | A1 | 10/2005 | Harrelson | |
| 2006/0243739 | A1 | 11/2006 | Sherman et al. | |
| 2006/0266815 | A1 | 11/2006 | Coltri-Johnson et al. | |
| 2007/0000934 | A1 | 1/2007 | Wolpow | |
| 2007/0267467 | A1 | 11/2007 | Burke | |
| 2007/0267468 | A1 | 11/2007 | Burke | |
| 2007/0267471 | A1 | 11/2007 | Falana | |
| 2009/0014353 | A1 | 1/2009 | Lewis et al. | |
| 2009/0200364 | A1 | 8/2009 | Oliveira | |
| 2010/0102110 | A1 | 4/2010 | Learn | |
| 2010/0102111 | A1 | 4/2010 | Learn | |
| 2010/0288657 | A1 | 11/2010 | Pinkstone | |
| 2011/0253587 | A1 * | 10/2011 | Pinkstone | B65D 5/6667 493/90 |
| 2012/0241512 | A1 * | 9/2012 | Markovic | B65D 21/0204 493/63 |
| 2014/0054360 | A1 | 2/2014 | Scrimger | |
| 2014/0166531 | A1 * | 6/2014 | Chen | B65D 81/022 206/588 |
| 2017/0190461 | A1 * | 7/2017 | Spivey, Sr. | B65D 5/5495 |
| 2023/0076878 | A1 * | 3/2023 | Simpkins | B65D 5/4266 |

FOREIGN PATENT DOCUMENTS

| | | | |
|---|---|---|---|
| DE | 298 17 195 | U1 | 11/1998 |
| DE | 202 16 854 | U1 | 1/2003 |
| EP | 0 133 595 | A2 | 2/1985 |
| EP | 0 704 386 | A1 | 4/1996 |
| FR | 1.379.931 | | 12/1963 |
| FR | 2 882 032 | | 8/2006 |
| GB | 1 218 016 | | 1/1971 |
| GB | 2 238 776 | A | 6/1991 |
| JP | 03275438 | A | 12/1991 |
| JP | 5-75116 | U | 10/1993 |
| JP | 2002-012222 | A | 1/2002 |
| JP | 2004-136905 | A | 5/2004 |
| KR | 20-0284781 | Y1 | 8/2002 |
| KR | 20-0304526 | Y1 | 2/2003 |
| WO | WO 98/31593 | | 7/1998 |
| WO | WO 03/082686 | A1 | 10/2003 |
| WO | WO 2004/063031 | A1 | 7/2004 |
| WO | WO 2005/110866 | A1 | 11/2005 |
| WO | WO 2020/205550 | A1 | 10/2020 |

* cited by examiner

TRAY WITH SEPARABLE FEATURES

CROSS-REFERENCE TO RELATED APPLICATION

The present application claims the benefit of U.S. Provisional Patent Application No. 63/328,614, filed on Apr. 7, 2022.

INCORPORATION BY REFERENCE

The disclosures of each of U.S. Provisional Patent Application No. 63/328,614, filed on Apr. 7, 2022, and U.S. Design patent application No. 29/888,800, filed on Apr. 5, 2023, are hereby incorporated by reference for all purposes as if presented in their entireties.

BACKGROUND OF THE DISCLOSURE

The present disclosure generally relates to containers for holding at least one article. In one embodiment, the present disclosure relates to containers in the form of trays for holding at least one article and that include separable features.

SUMMARY OF THE DISCLOSURE

According to one aspect, the disclosure is generally directed to a tray for holding one or more articles, the tray comprising a plurality of panels extending at least partially around an interior space of the tray, the plurality of panels comprising a bottom panel, at least one lower side panel, at least one upper side panel, and at least one end panel, and a plurality of end flaps foldably connected to a respective panel of the plurality of panels, the plurality of panels forms a plurality of separably connected tray portions such that the tray is separable into respective tray portions.

According to another aspect, the disclosure is generally directed to a blank for forming a tray for holding one or more articles, the blank comprising a plurality of panels for extending at least partially around an interior space of the tray formed from the blank, the plurality of panels comprising a bottom panel, at least one lower side panel, at least one upper side panel, and at least one end panel, and a plurality of end flaps foldably connected to a respective panel of the plurality of panels, the plurality of panels forms a plurality of separably connected tray portions of the blank for forming respective separably connected tray portions of the tray formed from the blank.

According to another aspect, the disclosure is generally directed to a method of forming a tray for holding one or more articles, the method comprising obtaining a blank, the blank comprising a plurality of panels comprising a bottom panel, at least one lower side panel, at least one upper side panel, and at least one end panel, the blank further comprising a plurality of end flaps foldably connected to a respective panel of the plurality of panels, the plurality of panels forms a plurality of separably connected tray portions of the blank. The method further comprises positioning the plurality of panels extending at least partially around an interior space of the tray and such that the plurality of separably connected tray portions of the blank form respective separably connected tray portions of the tray.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

Containers according to the present disclosure can accommodate containers of numerous different shapes. In this specification, the terms “lower,” “bottom,” “upper,” “top,” “front,” and “back” indicate orientations determined in relation to fully erected containers. As described herein, containers may be formed by multiple overlapping panels, portions, and/or end flaps. Such panels, portions, and/or end flaps may be designated in relative terms to one another, e.g., “first”, “second”, “third”, etc., in sequential or non-sequential reference, without departing from the disclosure.

Figure 1:
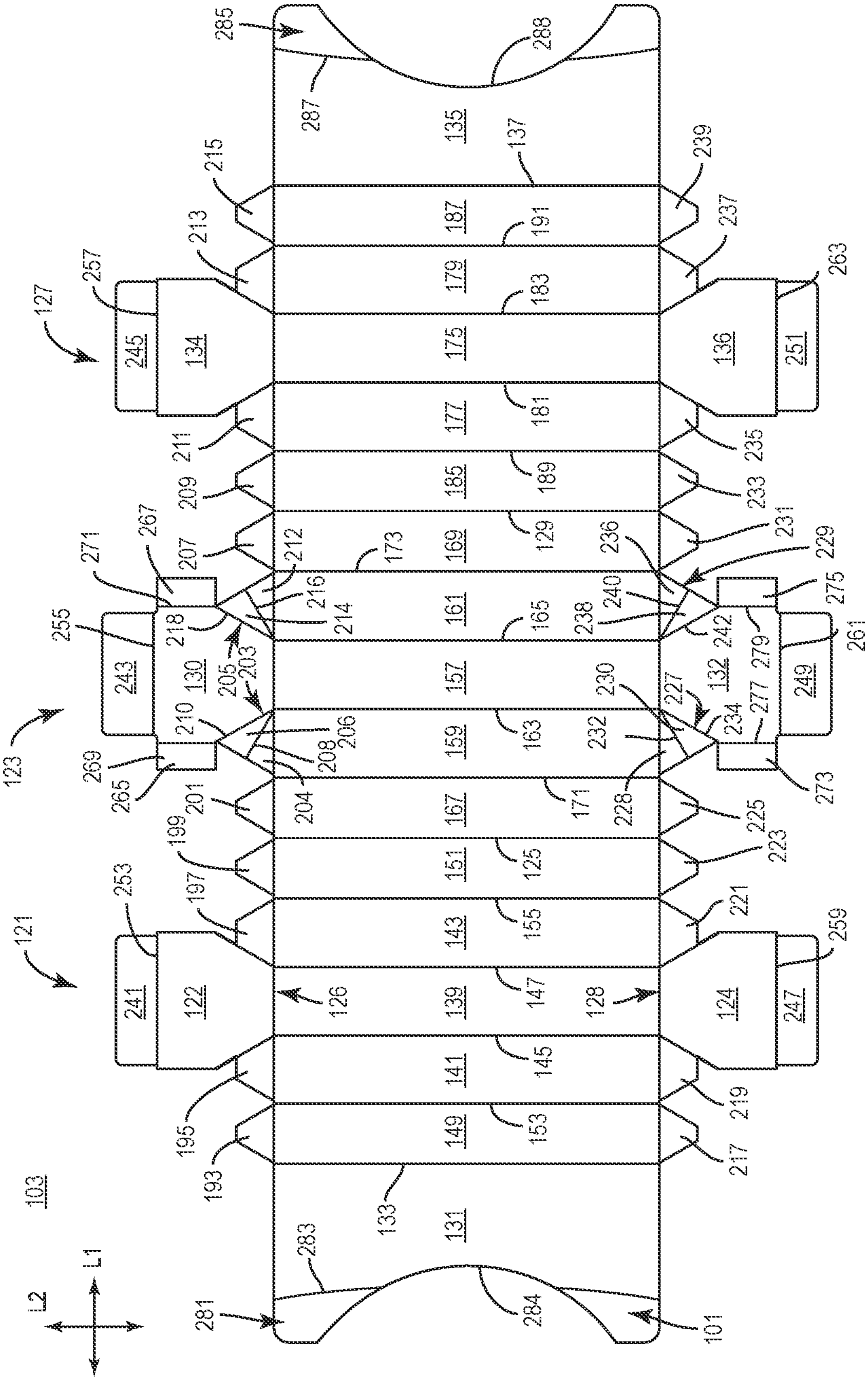
FIG. 1 is a plan view of an exterior surface of a blank for forming a tray according to an exemplary embodiment of the disclosure.
Figure 2:
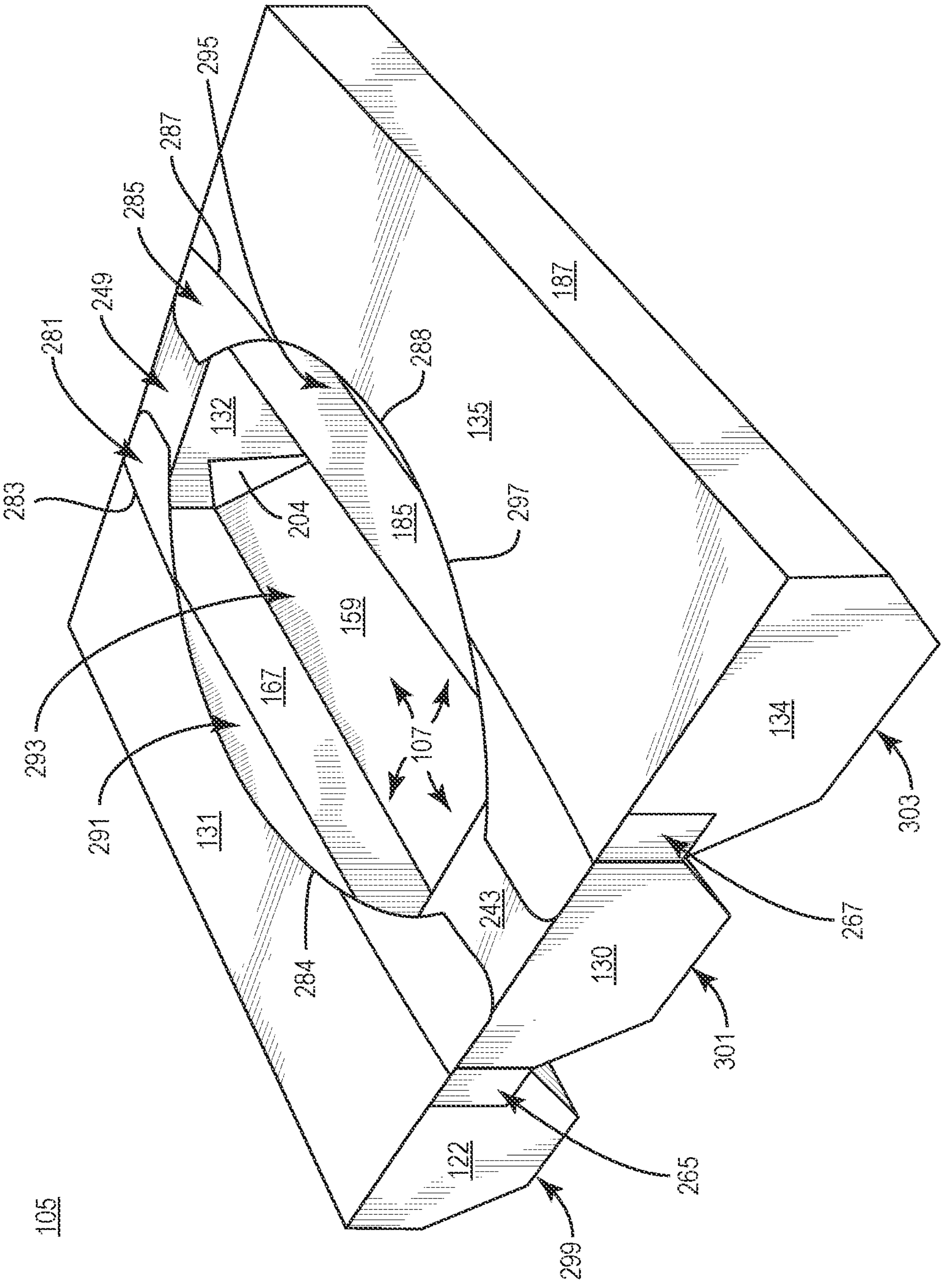
FIG. 2 is a perspective view of a tray formed from the blank of FIG. 1 according to an exemplary embodiment of the disclosure.

According to an exemplary embodiment of the disclosure, FIG. 1 illustrates an exterior surface 101 of a blank 103 for forming a container in the form of a tray 105 (FIG. 2). It will be understood that the tray 105 can have a different configuration, for example, a bowl, dish, plate, box, or carton, to name a few.

The tray 105 can be used for holding one or more articles such as food products P (FIG. 3), e.g., portioned retail food products that can include one or more of cookies, crackers, cakes, pastries, candies, nuts, popcorn, trail mix, gum, etc. In some embodiments, the articles can include frozen or non-frozen food products that can be provided in discrete portions, for example, chicken nuggets, French fries, onion rings, mozzarella sticks, chips, popcorn, other finger foods, etc. In embodiments, other types of articles that can include food products and/or non-food products can be placed in the tray 105 for service to a customer. In some embodiments, such products can be contained in additional packaging and then placed in the tray 105. The tray 105 could be otherwise shaped and arranged and could be used to hold other products and/or articles in similar or different environments without departing from the disclosure.

As shown in FIG. 1, the blank 103 has a lateral axis L1 and a longitudinal axis L2. As illustrated, the blank 103 includes a plurality of separably connected tray portions for forming separably connected tray portions of the tray 105. In the illustrated embodiment, the blank 103 includes a first tray/compartment portion 121 separably/foldably connected to a second tray/compartment portion 123 at a lateral line of weakening 125, and a third tray/compartment portion 127 foldably/separably connected to the second compartment portion 123 at a lateral line of weakening 129. Each tray portion 121, 123, 127 can comprise a plurality of panels or panel sections, as described further herein. The blank 103 can include a different number and/or arrangement of tray portions without departing from the disclosure.

The plurality of panels of the blank 103 can include a first top panel 131 foldably connected to a respective panel of the first tray portion 121 at a lateral line of weakening 133, and a second top panel 135 foldably connected to a respective panel of the third tray portion 127 at a lateral line of weakening 137.

A pair of end panels 122, 124 (broadly, “first end panel” and “second end panel”, respectively, or “first tray portion first end panel” and “first tray portion second end panel”, respectively”) can also be foldably connected to the first tray portion 121 at respective portion of respective longitudinal fold lines 126, 128, a pair of end panels 130, 132 (broadly, “first end panel” and “second end panel”, respectively, or “second tray portion first end panel” and “second tray portion second end panel”, respectively”) can be foldably connected to the second tray portion 123 at respective portions of the respective longitudinal fold lines 126, 128, and a pair of end panels 134, 136 (broadly, “first end panel” and “second end panel”, respectively, or “third tray portion first end panel” and “third tray portion second end panel”, respectively”) can be foldably connected to the third tray portion 127 at respective portions of the respective longitudinal fold lines 126, 128.

With continued reference to FIG. 1, the first tray portion 121 can include a bottom panel 139 (broadly, “first bottom panel” or “first tray portion bottom panel”), a pair of lower side panels 141, 143 (broadly, “first lower side panel” and “second lower side panel”, respectively, or “second lower side panel” and “first lower side panel”, respectively, or “first tray portion first lower side panel” and “first tray portion second lower side panel”, respectively, or “first tray portion second lower side panel” and “first tray portion first lower side panel”, respectively) foldably connected to the bottom panel 139 at respective lateral fold lines 145, 147, and a respective pair of upper side panels 149, 151 (broadly, “first upper side panel” and “second upper side panel”, respectively, or “second upper side panel” and “first upper side panel”, respectively, or “first tray portion first upper side panel” and “first tray portion second upper side panel”, respectively, or “first tray portion second upper side panel” and “first tray portion first upper side panel”, respectively) foldably connected to the respective lower side panels 141, 143 at respective lateral fold lines 153, 155. As shown, the upper side panel 149 can be foldably connected to the top panel 131 at the line of weakening 133.

Similarly, the second tray portion 123 can include a bottom panel 157 (broadly, “second bottom panel” or “second tray portion bottom panel”), a pair of lower side panels 159, 161 (broadly, “first lower side panel” and “second lower side panel”, respectively, or “second lower side panel” and “first lower side panel”, respectively, or “second tray portion first lower side panel” and “second tray portion second lower side panel”, respectively, or “second tray portion second lower side panel” and “second tray portion first lower side panel”, respectively) foldably connected to the bottom panel 157 at respective lateral fold lines 163, 165, and a respective pair of upper side panels 167, 169 (broadly, “first upper side panel” and “second upper side panel”, respectively, or “second upper side panel” and “first upper side panel”, respectively, or “second tray portion first upper side panel” and “second tray portion second upper side panel”, respectively, or “second tray portion second upper side panel” and “second tray portion first upper side panel”, respectively) foldably connected to the respective lower side panels 159, 161 at respective lateral fold lines 171, 173. As also shown, the upper side panel 167 of the second tray portion 123 can be separably/foldably connected to the upper side panel 151 of the first tray portion 121 at the lateral line of weakening 125.

The third tray portion 127 can include a bottom panel 175 (broadly, “bottom panel” or “third bottom panel”), a pair of lower side panels 177, 179 (broadly, “first lower side panel” and “second lower side panel”, respectively, or “second lower side panel” and “first lower side panel”, respectively, or “third tray portion first lower side panel” and “third tray portion second lower side panel”, respectively, or “third tray portion second lower side panel” and “third tray portion first lower side panel”, respectively) foldably connected to the bottom panel 175 at respective lateral fold lines 181, 183, and a respective pair of upper side panels 185, 187 (broadly, “first upper side panel” and “second upper side panel”, respectively, or “second upper side panel” and “first upper side panel”, respectively, or “third tray portion first upper side panel” and “third tray portion second upper side panel”, respectively, or “third tray portion second upper side panel” and “third tray portion first upper side panel”, respectively) foldably connected to the respective lower side panels 177, 179 at respective lateral fold lines 189, 191. As also shown, the upper side panel 185 of the third tray portion 127 can be separably/foldably connected to the upper side panel 169 of the second tray portion 123 at the lateral line of weakening 129, and the top panel 135 can be foldably connected to the upper side panel 187 at the line of weakening 137.

The blank 103 and tray 105 formed therefrom can include a plurality of end flaps foldably connected to a respective panel of the plurality of panels. As shown, the plurality of end flaps can include respective end flaps 193, 195, 197, 199, 201, 203, 205, 207, 209, 211, 213, 215 foldably connected to the respective panels 149, 141, 139, 143, 151, 167, 159, 157, 161, 169, 185, 177, 175, 179, 187 at respective portions of the longitudinal fold line 126, and respective end flaps 217, 219, 221, 223, 225, 227, 229, 231, 233, 235, 237, 239 foldably connected to the respective panels 149, 141, 139, 143, 151, 167, 159, 157, 161, 169, 185, 177, 175, 179, 187 at respective portions of the longitudinal fold line 128. In the illustrated embodiment, one or more of the end flaps 203, 205, 227, 229 can have a gusseted configuration, including a plurality of respective foldably connected sections.

In particular, the end flap 203 can include a first portion 204 foldably connected to the lower side panel 159 at the respective portion of the fold line 126, and a second portion 206 foldably connected to the first portion 204 at an oblique fold line 208 and to the end panel 130 at an oblique fold line 210.

Similarly, the end flap 205 can include a first portion 212 foldably connected to the lower side panel 161 at the respective portion of the fold line 126, and a second portion 214 foldably connected to the first portion 212 at an oblique fold line 219 and to the end panel 130 at an oblique fold line 218.

The end flap 277 can include a first portion 228 foldably connected to the lower side panel 159 at the respective portion of the fold line 128, and a second portion 230 foldably connected to the first portion 228 at an oblique fold line 232 and to the end panel 132 at an oblique fold line 234.

The end flap 279 can include a first portion 236 foldably connected to the lower side panel 161 at the respective portion of the fold line 128, and a second portion 238 foldably connected to the first portion 236 at an oblique fold line 240 and to the end panel 132 at an oblique fold line 242.

Still referring to FIG. 1, the plurality of end flaps can include end flaps 241, 243, 245, 247, 249, 251 foldably connected to the respective end panels 122, 130, 134, 124, 132, 136 at respective longitudinal fold lines 253, 255, 257, 259, 261, 263, end flaps 265, 267 foldably/separably connected to the end panel 130 at respective lateral lines of weakening 269, 271, and end flaps 273, 275 foldably/separably connected to the end panel 132 at respective lateral lines of weakening 277, 279.

The plurality of end flaps of the blank 103 and tray 105 formed therefrom can also include a top end flap 281 foldably/separably connected to the top panel 131 at a generally curved line of weakening 283, the top end flap 281 and the line of weakening 283 at least partially interrupted by a generally curved free lateral edge 284 of the blank 103 and tray 105 formed therefrom.

Similarly, a top end flap 285 can be foldably/separably connected to the top panel 135 at a generally curved line of weakening 287, the top end flap 285 and the line of weakening 287 at least partially interrupted by a generally curved free lateral edge 288 of the blank 103 and tray 105 formed therefrom.

With additional reference to FIG. 2, formation of the tray 105 from the blank 103 according to an exemplary embodiment of the disclosure will be described. As shown, the blank 103 can be inverted, e.g., such that the exterior surface 101 is positioned on a supporting surface and such that an interior surface of the blank 103 is positioned facing upwardly.

The side panels 141, 143 can be folded at the respective fold lines 145, 147 into oblique relation with the bottom panel 139, and the side panels 149, 143 can be folded at the respective fold lines 153, 155 into oblique relation with respect to the side panels 141, 143 as well as into generally perpendicular relation with the bottom panel 139.

The end panels 122, 124 can be folded at respective portions of the respective fold lines 126, 128 into generally upright relation with the panels 149, 141, 139, 143, 151.

The end flaps 193, 195, 197, 199 can be folded at respective portions of the fold line 126 into at least partial face-to-face contact with respective portions of the end panel 122, and the end flaps 217, 219, 221, 223 can be folded at respective portions of the fold line 128 into at least partial face-to-face contact with respective portions of the end panel 124. The end flaps 241, 247 can also be folded at the respective fold lines 253, 259 and positioned into generally spaced and parallel relation with the bottom panel 139.

Simultaneously or thereafter, the side panels 159, 161 can be folded at the respective fold lines 163, 165 into oblique relation with the bottom panel 157, and the side panels 167, 169 can be folded at the respective fold lines 171, 173 into oblique relation with respect to the side panels 159, 161 as well as into generally perpendicular relation with the bottom panel 157.

The end panels 130, 132 can be folded at respective portions of the respective fold lines 126, 128 into generally upright relation with the panels 167, 159, 157, 161, 169.

The end flaps 243, 249 can also be folded at the respective fold lines 255, 261 and positioned into generally spaced and parallel relation with the bottom panel 157.

The end flaps 201, 203, 205, 207 can be folded at respective portions of the fold line 126 into at least partial face-to-face contact with respective portions of the end panel 130, and the end flaps 225, 227, 229, 231 can be folded at respective portions of the fold line 128 into at least partial face-to-face contact with respective portions of the end panel 132.

As described above, the end flaps 203, 205, 227, 229 can have a generally gusseted configuration such that the second portion 206 of the end flap 203 can be folded at the fold line 210 into at least partial face-to-face contact with the end panel 130, and such that the first portion 204 of the end flap 203 can be folded at the fold line 208 and/or the respective portion of the fold line 126 into at least partial face-to-face contact with the second portion 206 of the end flap 203.

Similarly, the end flap 205 can be folded such that the second portion 214 of the end flap 205 can be folded at the fold line 218 into at least partial face-to-face contact with the end panel 130, and such that the first portion 216 of the end flap 205 can be folded at the fold line 216 and/or the respective portion of the fold line 126 into at least partial face-to-face contact with the second portion 214 of the end flap 205.

The end flap 227 can be folded such that the second portion 230 of the end flap 227 can be folded at the fold line 234 into at least partial face-to-face contact with the end panel 132, and such that the first portion 228 of the end flap 227 can be folded at the fold line 230 and/or the respective portion of the fold line 128 into at least partial face-to-face contact with the second portion 230 of the end flap 227.

Further, the end flap 229 can be folded such that the second portion 238 of the end flap 229 can be folded at the fold line 242 into at least partial face-to-face contact with the end panel 132, and such that the first portion 236 of the end flap 229 can be folded at the fold line 240 and/or the respective portion of the fold line 128 into at least partial face-to-face contact with the second portion 238 of the end flap 229.

Simultaneously or thereafter, the side panels 177, 179 can be folded at the respective fold lines 181, 183 into oblique relation with the bottom panel 175, and the side panels 185, 187 can be folded at the respective fold lines 189, 191 into oblique relation with respect to the side panels 177, 179 as well as into generally perpendicular relation with the bottom panel 175.

The end panels 134, 136 can be folded at respective portions of the respective fold lines 126, 128 into generally upright relation with the panels 185, 177, 178, 179, 187.

The end flaps 209, 211, 213, 214 can be folded at respective portions of the fold line 126 into at least partial face-to-face contact with respective portions of the end panel 134, and the end flaps 233, 235, 237, 239 can be folded at respective portions of the fold line 128 into at least partial face-to-face contact with respective portions of the end panel 136. The end flaps 245, 251 can also be folded at the respective fold lines 257, 263 and positioned into generally spaced and parallel relation with the bottom panel 175.

In such arrangement, the end flaps 265, 267 extending from the end panel 130 can be positioned in at least partial face-to-face contact with the respective end panels 122, 134, and the end flaps 273, 275 extending from the end panel 132 can be positioned in at least partial face-to-face contact with the respective end panels 124, 136.

The top end panels 131, 135 can be folded at the respective fold lines 133, 137 into generally spaced and parallel relation with the respective bottom panels 139, 175 and overlying respective compartment interior spaces 291, 295 formed by the panels and flaps associated with of the respective tray portions 121, 127, and with the end flaps 281, 285 carried into generally spaced and parallel relation with the bottom panel 157 and overlying a compartment interior space 293 formed by the panels and flaps associated with the tray portion 123. As shown, the curved free edges 284, 288 of the respective end flaps 281, 285 can define an opening or aperture 297 through which at least a portion of the respective interior compartment spaces 291, 293, 295 can be viewed.

The aforementioned arrangement of the tray 105 can be maintained via one or more applications of an adhesive such as glue. For example, in some embodiments, an adhesive such as glue can be applied to one or more surfaces of one or more of the end flaps 193, 195, 197, 199, 201, 203, 205, 207, 209, 22, 213, 214, 217, 218, 221, 223, 225, 227, 229, 231, 233, 235, 237, 239, 265, 267, 273, 275, 281, 285.

In this regard, one or more articles can be inserted into one or more of the respective interior compartment spaces 291, 293, 295, e.g., to maintain separation thereof, for aesthetics or visibility, to prevent commingling of different products, for freshness, etc. In the illustrated embodiment, the articles can include food products P in the form of cookies or other snacks. The food products P are shown as individually wrapped packages provided in each compartment space 291, 293, 295, through a different number, type, and/or arrangement of food products can be provided without departing from the disclosure.

The tray 105 formed from the blank 103 can include a plurality of tray portions 299, 301, 303 at least partially delineated at the respective lines of weakening 125 between the side panels 151, 167, the line of weakening 129 between the side panels 169, 185, the line of weakening 269 between the end flap 265 and the end panel 130, the line of weakening 271 between the end flap 267 and the end panel 130, the line of weakening 277 between the end flap 273 and the end panel 132, the line of weakening 279 between the end flap 275 and the end panel 132, the line of weakening 283 between the top panel 131 and the top end flap 281, and/or the line of weakening 287 between the top panel 135 and the top end flap 285.

Figure 3:
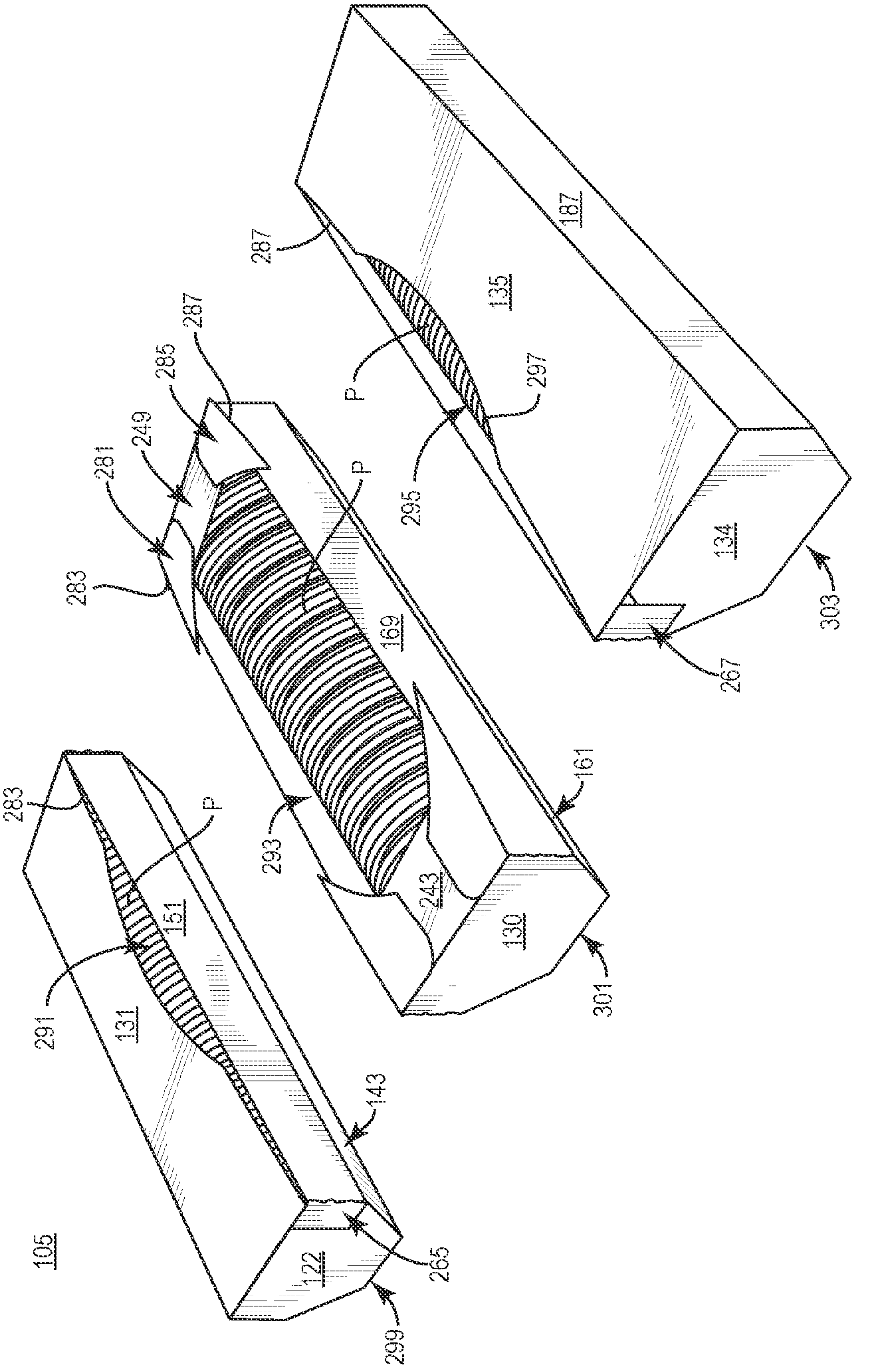
FIG. 3 is a perspective view of the tray of FIG. 2 having portions separated from one another according to an exemplary embodiment of the disclosure.

With additional reference to FIG. 3, the tray portion 299 can be separated from the tray portion 301 by separating the top end flap 281 from the top panel 131 at the line of weakening 283, separating the side panel 151 from the side panel 167 at the line of weakening 125, separating the end flap 265 from the end panel 130 at the line of weakening 265, and separating the end flap 273 from the end panel 132 at the line of weakening 277.

In such an arrangement, the tray portion 299 can be provided as a partially enclosed structure within which a metered or portioned amount of food products P in the compartment space 291 can be separated from the remainder of the tray 105, for example, for individual or portioned servings. The food products P may be partially visible between portions of the top panel 131/free edge 284 and the side panel 151. The end flaps 265, 273 can remain attached to the respective end panels 122, 124, for example, to provide a tamper evident feature that the tray portion 299 has been separated from the remainder of the tray 105.

Furthermore, the tray portion 303 can be separated from the tray portion 301 by separating the top end flap 285 from the top panel 135 at the line of weakening 287, separating the side panel 185 from the side panel 169 at the line of weakening 129, separating the end flap 267 from the end panel 134 at the line of weakening 271, and separating the end flap 275 from the end panel 136 at the line of weakening 279.

In such an arrangement, the tray portion 303 can be provided as a partially enclosed structure within which a metered or portioned amount of food products P in the compartment space 295 can be separated from the remainder of the tray 105, for example, for individual or portioned servings. The food products P may be partially visible between portions of the top panel 135/free edge 288 and the side panel 185. The end flaps 267, 275 can remain attached to the respective end panels 134, 136, for example, to provide a tamper evident feature that the tray portion 303 has been separated from the remainder of the tray 105.

Similarly, the tray portion 301 can remain as a partially enclosed structure within which a metered or portioned amount of food products P in the compartment space 293 are provided, for example, for individual or portioned servings. The food products P can be visible through the aperture 297.

In this regard, the tray 105 is configured and arranged with separable tray portions 299, 301, 303 that provide food products P in respective portions compartment spaces 291, 293, 295, for selective product placement in retail spaces, for portioning, for distribution/serving to individual users, etc.

Figure 4:
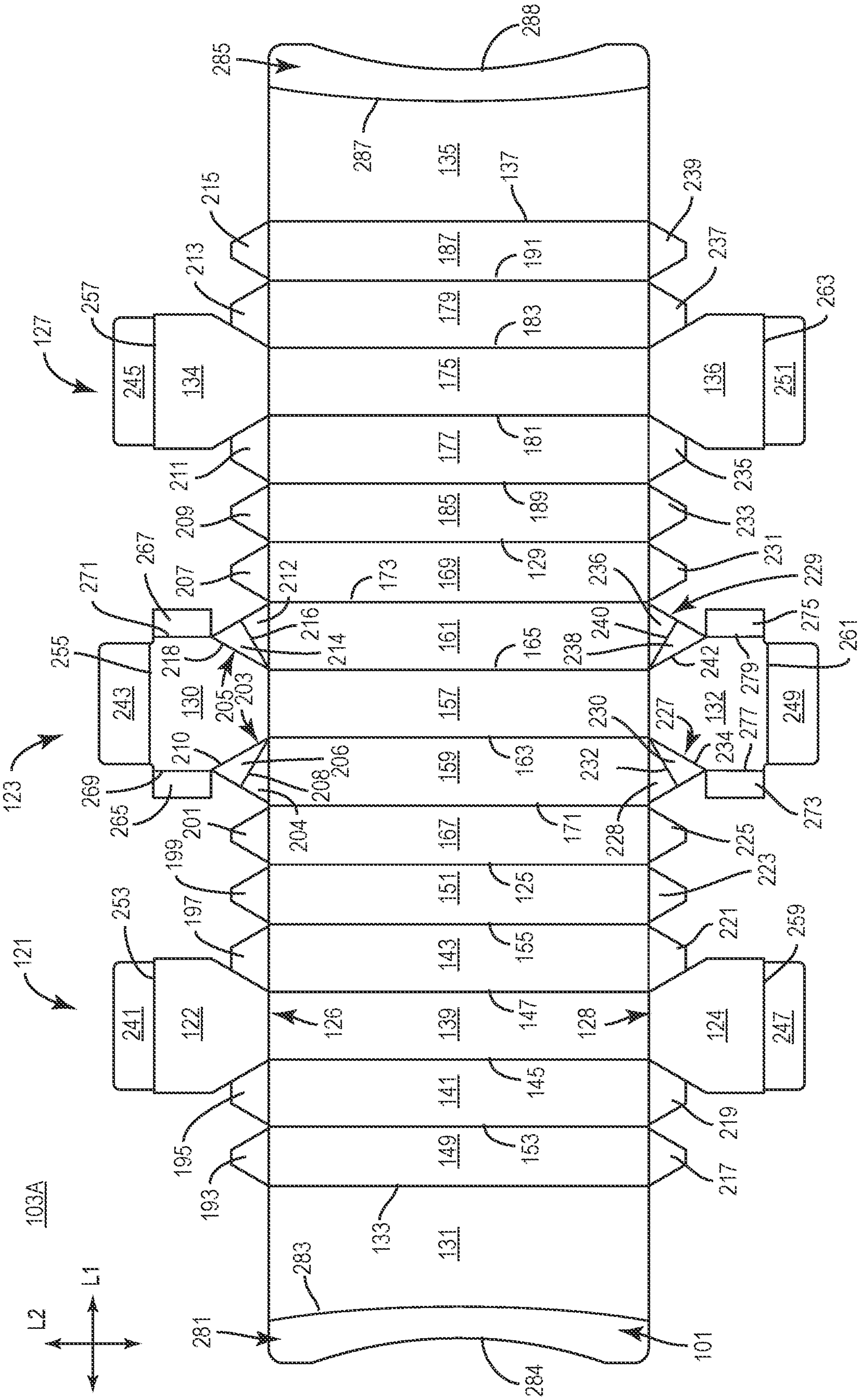
FIG. 4 is a plan view of an exterior surface of a blank for forming a tray according to an alternative exemplary embodiment of the disclosure.

With additional reference to FIG. 4, the exterior surface 101 of an alternative configuration of the blank 103, generally designated 103A for forming an alternative configuration of the tray 105, generally designated 105A is illustrated. As shown, the blank 103 can be generally similar to that described above, except that the fold lines 283, 285 associated with the respective top end flaps 281, 285 can be positioned spaced away from the respective free edges 284, 288 so as to not interrupt the respective free edges 284, 288.

Figure 5:
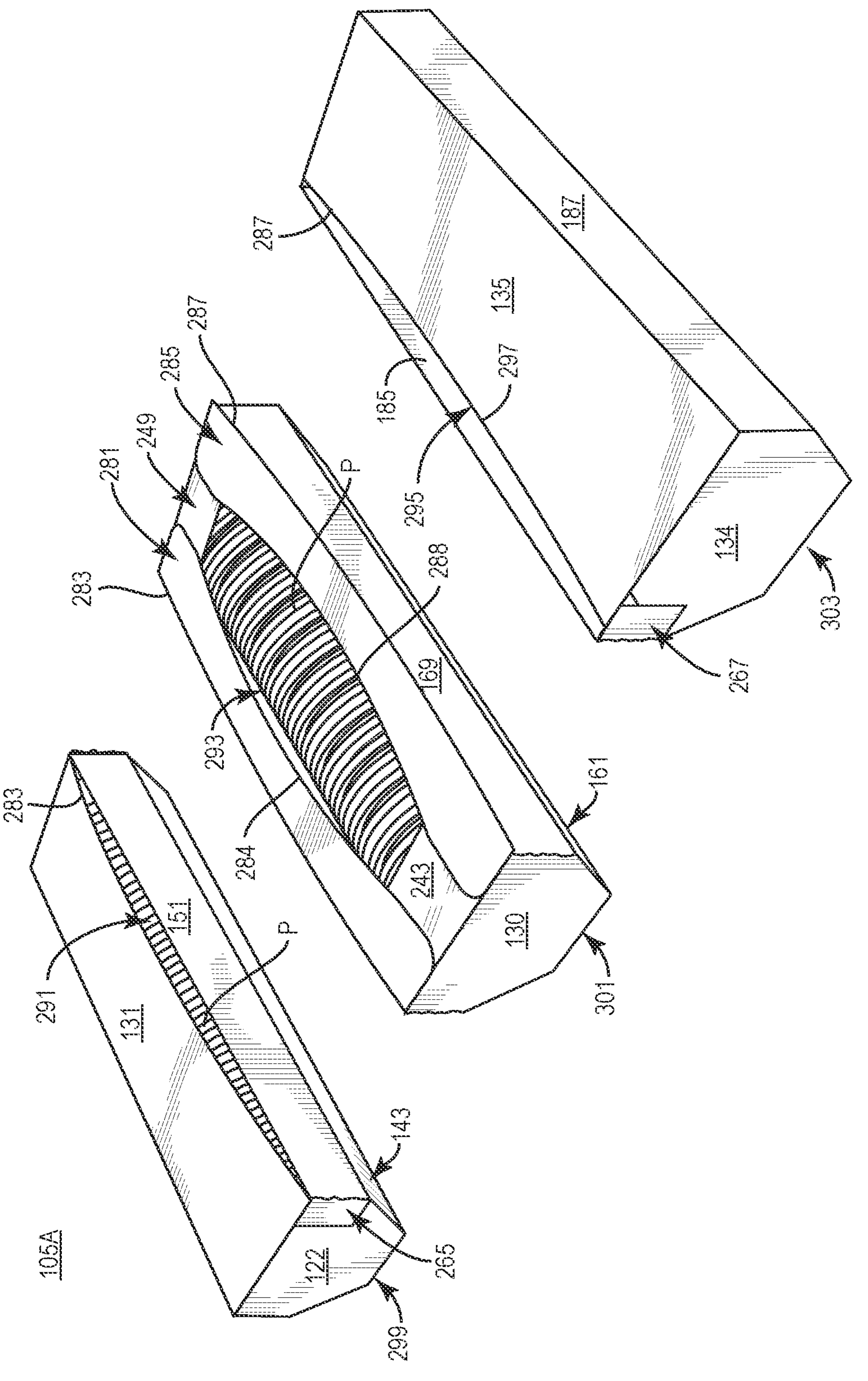
FIG. 5 is a perspective view of the tray of FIG. 4 having portions separated from one another according to an alternative exemplary embodiment of the disclosure.

In this regard, and with additional reference to FIG. 5, the tray 105A can be formed from the blank 103A in the manner described above with respect to the formation of the tray 105 from the blank 103, e.g., such that the tray portions 299, 301, 303 are provided with respective compartment spaces 291, 293, 295 for holding respective portions of food products P.

Furthermore, and as shown, the tray portions 299, 301, 303 of the tray 105A can be separable from one another in the manner described above with respect to the tray 105, e.g., for selective product placement in retail spaces, for portioning, for distribution/serving to individual users, etc.

It will be understood that one or both of the blanks 103, 103A and respective trays 105, 105A formed therefrom can have a different number, configuration, and/or arrangement of features without departing from the disclosure.

In general, the blanks described herein may be constructed from paperboard having a caliper so that it is heavier and more rigid than ordinary paper. The blanks can also be constructed of other materials, such as cardboard, sheet plastics or any other material having properties suitable for enabling the container to function at least generally as described above. The blanks can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

As an example, a tear line can include: a slit that extends partially into the material along the desired line of weakness, and/or a series of spaced apart slits that extend partially into and/or completely through the material along the desired line of weakness, or various combinations of these features. As a more specific example, one type of tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

In accordance with the exemplary embodiments, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The above embodiments may be described as having one or more panels adhered together by glue during erection of the container embodiments. The term "glue" is intended to encompass all manner of adhesives commonly used to secure container panels in place, and is not intended to exclude heat, chemical, or frequency bonding techniques.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A tray for holding one or more articles, the tray comprising:

a plurality of panels forming a plurality of separably connected tray portions, each tray portion defining a respective interior space, the plurality of panels comprising a bottom panel, at least one lower side panel, at least one end panel, at least one upper side panel;

a top surface including a plurality of top panels, wherein the top surface defines an opening overlying each of the respective interior spaces of the plurality of separably connected tray portions; and a plurality of end flaps foldably connected to the at least one lower side panel, to the at least one upper side panel and to the at least one end panel, the plurality of tray portions comprises a first tray portion, a second tray portion, and a third tray portion, the plurality of top panels comprises a first top panel foldably connected to the first tray portion, a first top end flap is separably connected to the first top panel at a first curved line of weakening and at least partially forming a first curved free edge of the opening, and a second top panel foldably connected to the third tray portion, a second top end flap is separably connected to the second top panel at a second curved line of weakening and at least partially forming a second curved free edge of the opening.

2. The tray of claim 1, wherein the first tray portion comprises the bottom panel, the at least one lower side panel, and the at least one upper side panel, the at least one lower side panel is foldably connected to the bottom panel, the at least one upper side panel is foldably connected to the at least one lower side panel, the at least one end panel is foldably connected to the bottom panel, and the at least one upper side panel is separably connected to the second tray portion at a line of weakening.

3. The tray of claim 2, wherein the bottom panel, the at least one lower side panel, the at least one upper side panel, and the at least one end panel extend around a first compartment space of the interior spaces of the tray, and the second tray portion forms a second compartment space of the interior spaces of the tray.

4. The tray of claim 3, wherein the at least one lower side panel is obliquely arranged with respect to the bottom panel, and the at least one upper side panel is generally perpendicular with respect to the at least one lower side panel.

5. The tray of claim 4, wherein the at least one lower side panel is a first lower side panel foldably connected to the bottom panel, the at least one upper side panel is a first upper side panel foldably connected to the first lower side panel, the plurality of panels further comprises a second lower side panel foldably connected to the bottom panel, and the plurality of panels further comprises a second upper side panel foldably connected to the second lower side panel.

6. The tray of claim 5, wherein the second lower side panel is obliquely arranged with respect to the bottom panel, and the second upper side panel is generally perpendicular with respect to the bottom panel.

7. The tray of claim 6, wherein the plurality of panels further comprises a top end panel foldably connected to one of the first upper side panel and the second upper side panel and positioned at least partially overlying the first compartment space.

8. The tray of claim 7, wherein the at least one end panel is a first end panel, and the plurality of panels further comprises a second end panel foldably connected to the bottom panel.

9. The tray of claim 3, wherein the bottom panel is a first tray portion bottom panel, the at least one lower side panel is a first tray portion at least one lower side panel, the at least one upper side panel is a first tray portion at least one upper side panel, and the at least one end panel is a first tray portion at least one end panel, the plurality of panels further comprises a second tray portion bottom panel, a second tray portion at least one lower side panel foldably connected to the second tray portion bottom panel, a second tray portion at least one upper side panel foldably connected to the second tray portion at least one lower side panel, and a second tray portion at least one end panel foldably connected to the second tray portion bottom panel, the second tray portion comprises the second tray portion bottom panel, the second tray portion at least one lower side panel, the second tray portion at least one upper side panel, and the second tray portion at least one end panel extending at least partially around the second compartment space of the interior spaces of the tray, the second tray portion at least one upper side panel being separably connected to the first tray portion at least one upper side panel.

10. The tray of claim 9, wherein the plurality of end flaps comprises at least one end flap separably connected to the first tray portion at least one end panel, the at least one end flap being in at least partial face-to-face contact with the first tray portion at least one end panel.

11. The tray of claim 9, wherein the first tray portion at least one lower side panel is obliquely arranged with respect to the first tray portion bottom panel, the first tray portion at least one upper side panel is generally perpendicular with respect to the first tray portion bottom panel, the second tray portion at least one lower side panel is obliquely arranged with respect to the second tray portion bottom panel, and the second tray portion at least one upper side panel is generally perpendicular with respect to the second tray portion bottom panel.

12. The tray of claim 11, wherein the first tray portion at least one lower side panel is a first tray portion first lower side panel foldably connected to the first tray portion bottom panel, the first tray portion at least one upper side panel is a first tray portion first upper side panel foldably connected to the first tray portion first lower side panel, the second tray portion at least one lower side panel is a second tray portion first lower side panel foldably connected to the second tray portion bottom panel, the second tray portion at least one upper side panel is a second tray portion first upper side panel foldably connected to the second tray portion first lower side panel, the plurality of panels further comprises a first tray portion second lower side panel foldably connected to the first tray portion bottom panel, a first tray portion second upper side panel foldably connected to the first tray portion second lower side panel, a second tray portion second lower side panel foldably connected to the second tray portion bottom panel, and a second tray portion second upper side panel foldably connected to the second tray portion second lower side panel.

13. The tray of claim 12, wherein the first tray portion at least one end panel is a first tray portion first end panel foldably connected to the first tray portion bottom panel, the second tray portion at least one end panel is a second tray portion first end panel foldably connected to the second tray portion bottom panel, and the plurality of panels further comprises a first tray portion second end panel foldably connected to the first tray portion bottom panel and a second tray portion second end panel foldably connected to the second tray portion bottom panel.

14. The tray of claim 13, wherein the plurality of tray portions comprises a third tray portion separably connected to the second tray portion second upper side panel, the third tray portion forming a third compartment space of the interior spaces of the tray, and wherein the first top panel is foldably connected to the first tray portion and the second top panel is foldably connected to the third tray portion.

15. The tray of claim 14, wherein the plurality of panels comprises the first top panel foldably connected to the first tray portion first upper side panel and the first top end flap separably connected to the first top panel at the first curved line of weakening adjacent the first curved free edge of the opening.

16. The tray of claim 15, wherein the first curved free edge of the opening interrupts the first curved line of weakening.

17. The tray of claim 15, wherein the curved line of weakening is spaced away from the curved free edge of the top end flap.

* * * * *